United States Patent
Xu

(10) Patent No.: US 8,059,632 B2
(45) Date of Patent: Nov. 15, 2011

(54) METHOD AND SYSTEM FOR TRANSMISSION OF CHANNEL QUALITY INDICATORS (CQIS) BY MOBILE DEVICES IN A WIRELESS COMMUNICATIONS NETWORK

(75) Inventor: Shugong Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1096 days.

(21) Appl. No.: 11/855,902

(22) Filed: Sep. 14, 2007

(65) Prior Publication Data

US 2009/0073958 A1    Mar. 19, 2009

(51) Int. Cl.
- *H04L 12/66* (2006.01)
- *H04W 4/00* (2009.01)
- *H04W 36/00* (2009.01)
- *H04L 12/26* (2006.01)
- *H04B 7/00* (2006.01)

(52) U.S. Cl. ........ 370/352; 370/329; 370/328; 370/252; 455/436; 455/522

(58) Field of Classification Search .................. 370/352, 370/328, 329, 336, 337, 493, 528, 345, 347, 370/349, 392; 455/466
See application file for complete search history.

(56) References Cited

U.S. PATENT DOCUMENTS

| | | | | |
|---|---|---|---|---|
| 6,282,182 B1 * | 8/2001 | Pecen et al. | ................... | 370/336 |
| 2005/0265373 A1 * | 12/2005 | Khan | ............................. | 370/437 |
| 2006/0067324 A1 * | 3/2006 | Kim et al. | .................. | 370/395.2 |
| 2007/0053456 A1 | 3/2007 | Kim | | |
| 2007/0104149 A1 | 5/2007 | Khan et al. | | |
| 2007/0104150 A1 | 5/2007 | Fernandez-Corbaton et al. | | |
| 2007/0115796 A1 | 5/2007 | Jeong et al. | | |
| 2008/0014946 A1 * | 1/2008 | Kubota | ......................... | 455/436 |
| 2010/0278196 A1 * | 11/2010 | Kapoor et al. | ................ | 370/477 |

OTHER PUBLICATIONS

3rd Generation Partnership Project; Technical Specification Group Radio Access Network; Physical Channels and Modulation (Release 8), 3GPP TS 36.211 V0.4.0 (Feb. 2007).

(Continued)

*Primary Examiner* — Ian N Moore
*Assistant Examiner* — Stephanie Chang
(74) *Attorney, Agent, or Firm* — Thomas R. Berthold

(57) ABSTRACT

A method and system for optimizing channel quality indicator (CQI) transmissions by mobile devices in a cellular network allows transmission of CQIs at a slower rate and with fewer bits during voice-over-internet-protocol (VoIP) sessions than during non-real-time (NRT) data transmissions. A VoIP transmission typically includes "talkspurt" periods, during which VoIP packets are transmitted, and silence periods, which start with a silence indication (SID) packet and continue with periodic SID packets until a VoIP packet is received. When the base station is transmitting NRT data, the mobile device transmits CQIs to the base station at a first rate, with each CQI having a first fixed number of bits. When the base station is transmitting VoIP to the mobile device, then during a talkspurt period, the mobile device may transmit CQIs to the base station at a second rate slower than the first rate, and each CQI may have a second fixed number of bits less than the first fixed number of bits. However, during a silence period, the mobile device does not transmit CQIs to the base station, and uplink channel resources allocated for the CQIs can be reallocated to other mobile devices.

6 Claims, 6 Drawing Sheets

OTHER PUBLICATIONS

3rd Generation Partnership Project;Technical Specification Group Radio Access Network; Evolved Universal Terrestrial Radio Access (E-UTRA) and Evolved Universal Terrestrial Radio Access Network (E-UTRAN);Overall description; Stage 2 (Release 8) 3GPP TS 36.300 V8.1.0 (Jun. 2007).

3GPP TSG-RAN WG2 #58bis (R2-07777) Orlando, Florida, Jun. 25-29, 2007.

3GPP TSG-RAN WG2 #58bis (R2-072599) Orlando, Florida, Jun. 25-29, 2007.

3GPP TSG RAN1 Meeting #49 (R1-072639) Kobe, Japan, May 7-11, 2007.

3GPP TSG-RAN WG2 Meeting #57bis (R2-071535) St. Julian's, Malta, Mar. 26-30, 2007.

3GPP TSG-RAN WG2 #55 (R2-062788) Seoul, Korea, Oct. 9-13, 2006.

3GPP TSG-RAN WG2 #58 (R2-071818) Kobe, Japan, May 7-11, 2007.

3GPP TSG-RAN WG2 #57 (R2-071368) Malta, Mar. 2007.

3GPP TSG-RAN WG2 #59 (R2-073582) Athens, Greece, Aug. 20-24, 2007.

\* cited by examiner

METHOD AND SYSTEM FOR TRANSMISSION OF CHANNEL QUALITY INDICATORS (CQIS) BY MOBILE DEVICES IN A WIRELESS COMMUNICATIONS NETWORK

RELATED APPLICATIONS

This application is related to application Ser. No. 11/837,952, filed Aug. 13, 2007, titled "METHOD AND SYSTEM FOR CONTROL OF DISCONTINUOUS RECEPTION (DRX) BY A MOBILE DEVICE IN A WIRELESS COMMUNICATIONS NETWORK SUPPORTING VOICE-OVER-INTERNET-PROTOCOL (VoIP)", and assigned to the same assignee as this application.

This application is also related to application Ser. No. 11/855,919, filed concurrently with this application, titled "METHOD AND SYSTEM FOR VOICE-OVER-INTERNET-PROTOCOL (VoIP) TRANSMISSION IN A WIRELESS COMMUNICATIONS NETWORK", and assigned to the same assignee as this application.

BACKGROUND OF THE INVENTION

1. Field of the Invention

The invention relates generally to a wireless communications network, like a cellular network, and more particularly to a method and system for optimizing channel quality indicator (CQI) transmissions by mobile devices during voice-over-internet-protocol (VoIP) transmissions.

2. Description of the Related Art

A cellular network is a wireless communications system made up of a number of cells, each served by a fixed transmitter, known as a cell site or base station. Each cell site in the network typically overlaps other cell sites. The most common form of cellular network is a mobile phone (cell phone) system. The base stations are connected to cellular telephone exchanges or "switches", which in turn connect to the public telephone network or another switch of the cellular company.

The 3$^{rd}$ Generation Partnership Project (3GPP) is a worldwide consortium to create a specification for a globally applicable third generation (3G) mobile phone system. 3GPP's plans are currently in development under the title Long Term Evolution (LTE). The 3GPP LTE project is to improve the Universal Mobile Telecommunications System (UMTS) terrestrial radio access mobile phone standard to cope with future requirements. Goals of 3GPP LTE include improving efficiency, lowering costs, improving services, making use of new spectrum opportunities, and better integration with other open standards. The 3GPP LTE technical specification is described in a set of reference documents including 3*rd Generation Partnership Project; Technical Specification Group Radio Access Network; Physical Channels and Modulation (Release 8)*, 3GPP TS 36.211 V0.4.0 (2007-02); and 3*rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage* 2 *(Release* 8), 3GPP TS 36.300 V8.1.0 (2007-06). In 3GPP LTE (E-UTRA and E-UTRAN) terminology, a base station is called an "eNode-B" (eNB) and a mobile terminal or device is called a "user equipment" (UE).

In 3GPP LTE, the eNB regularly transmits a downlink reference symbol (DLRS) that is used by the UEs for channel measurement, such as signal-to-interference ratio (SINR), which may be represented by a channel quality indicator (CQI). Each UE regularly transmits CQIs back to the eNB to enable the eNB to perform resource scheduling. Resource scheduling means the eNB allocates the modulation schemes, coding rates and subcarrier frequencies to optimize the downlink and uplink transmissions for each UE.

The data transmitted over the wireless network is often categorized as either non-real-time (NRT) data or real-time (RT) data. Examples of NRT data include data transmitted during web browsing by a UE or text-messaging to a UE, while an example of RT data is voice communication between UEs. The typical manner of resource scheduling for NRT data is "dynamic" scheduling by the eNB to each UE at each transmission time interval (TTI). During dynamic scheduling, the UE regularly transmits CQIs back to the eNB.

However, in 3GPP LTE the UEs are also required to transmit and receive RT data, specifically voice data, which is considered the most important application in LTE and will be carried as voice-over-internet-protocol (VoIP) transmissions. A typical VoIP session has periodic small data packets at fixed intervals and periodic silence indication (SID) packets at fixed intervals. Unlike NRT data transmission, VoIP transmission is handled using "semi-persistent" scheduling. In contrast to dynamic scheduling, in "semi-persistent" scheduling when a UE's downlink reception is enabled, if the UE cannot find its resource allocation, a downlink transmission according to a predefined resource allocation is assumed. VoIP transmission and its associated semi-persistent method of resource allocation presents special issues regarding the transmission of CQIs by the UEs. What is needed is a method and system for optimizing CQI transmissions during VoIP sessions.

SUMMARY OF THE INVENTION

The invention relates to a method and system for optimizing channel quality indicator (CQI) transmissions by mobile devices in a cellular network during voice-over-internet-protocol (VoIP) sessions. The network includes at least one base station (eNodeB or eNB) and a plurality of mobile devices (user equipment or UEs). The eNB is capable of non-real-time (NRT) data transmissions as well as VoIP transmissions. A VoIP transmission typically includes "talkspurt" periods, during which VoIP packets are transmitted, and silence periods, which start with a silence indication (SID) packet and continue with periodic SID packets until a VoIP packet is received. When the eNB is transmitting NRT data packets, and the UE is capable of receiving NRT data, then the UE transmits CQIs to the eNB at a first rate, with each CQI having a first fixed number of bits. When the eNB is transmitting VoIP to the UE, then during a talkspurt period, the UE may transmit CQIs to the eNB at a second rate slower than the first rate, and each CQI may have a second fixed number of bits less than the first fixed number of bits. However, during a silence period, the UE does not transmit CQIs to the eNB. Because the UE is not transmitting CQIs during silence periods, the uplink channel resources allocated for the CQIs can be reallocated by the eNB to other ULs.

The method and system includes methods for detecting the start and end of silence periods. In one technique both the eNb and the UE inspect the payloads of the VoIP packets and SID packets to identify each packet as either a VoIP packet or a SID packet. The first SID packet that occurs after a VoIP packet can thus be identified as the start of a silence period. Similarly, the first VoIP packet that occurs after a SID packet can thus be identified as the end of a silence period. In another technique only the eNB inspects the payloads of the VoIP packets and SID packets. The eNB then flags the first SID packet after a VoIP packet as the start of a silence period, and flags the first VoIP packet after a SID packet as the end of a silence period. The eNB then modifies the header of the medium access control (MAC) protocol data unit (PDU) prior to transmission to the UE. The UE then detects the modified MAC header to identify the start and end of silence periods. As an alternative to inspecting the IP payloads to identify packets as VoIP packets or SID packets, the IP packets can be inspected or checked for size to identify them as VoIP packets or SID packets, since it is known that a SID packet is smaller than the smallest possible VoIP packet.

For a fuller understanding of the nature and advantages of the present invention, reference should be made to the following detailed description taken together with the accompanying figures.

DETAILED DESCRIPTION OF THE INVENTION

Figure 1:
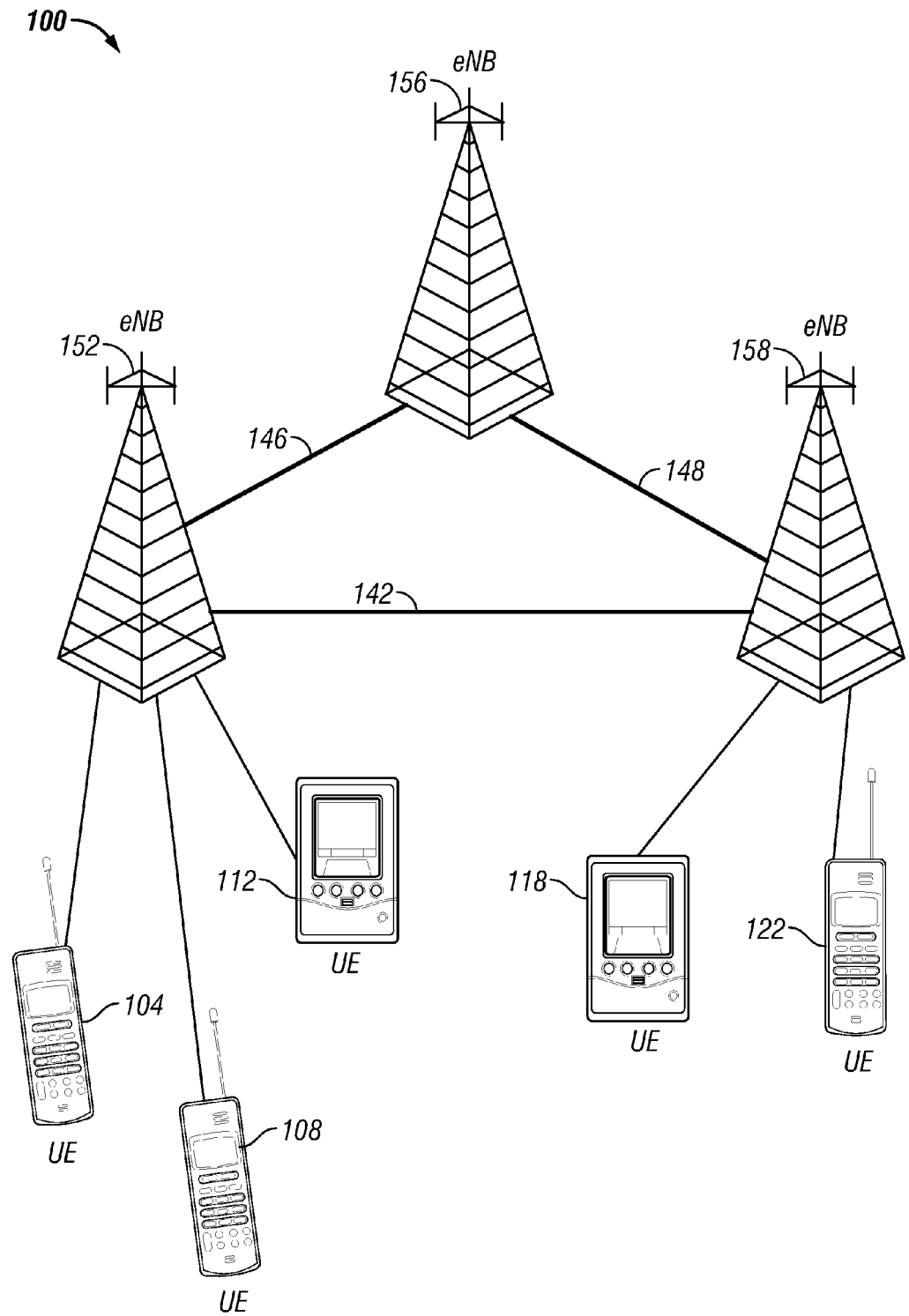
FIG. 1 is a diagram of a wireless communication system like that proposed by 3GPP LTE E-UTRAN and shows three eNodeBs (base stations) and five items of user equipment (UEs) (mobile devices).

FIG. 1 is a diagram of a wireless communication system 100 like that proposed by 3GPP LTE E-UTRAN. The system includes a plurality of eNodeBs (eNBs) (base stations) 152, 156, 158 and a plurality of UEs (mobile phones or terminals), such as mobile phones or terminals 104, 108, 112, 118 and 122, 124. The eNBs 152, 156, 158 are connected to each other via links 142, 146 and 148 and to a central gateway (not shown) that provides connection of the system to the public telephone network.

The eNBs 152, 156, 158, provide the E-UTRA user-plane and control-plane protocol terminations towards the UEs. An eNB is a unit adapted to transmit to and receive data from cells. In general, an eNB handles the actual communication across the radio interface, covering a specific geographical area, also referred to as a cell. Depending on sectoring, one or more cells may be served by one eNB, and accordingly one eNB may support one or more mobile devices (UEs) depending on where the UEs are located. Also, an eNB may have more than one physical transmit antenna port. An eNB may use multiple physical antenna ports to create "virtual" antenna ports. Thus, an antenna port may be a physical antenna port or a virtual antenna port. In 3GPP LTE E-UTRAN, four antenna ports are supported.

The eNBs 152, 156, 158 may perform several functions, which may include but are not limited to, radio resource management, radio bearer control, radio admission control, connection mobility control, dynamic resource allocation or scheduling, and/or scheduling and transmission of paging messages and broadcast information. In the example of FIG. 1, there are three eNBs 152, 156, 158. The first eNB 152 manages, including providing service and connections to, three UEs 104, 108, 112. Another eNB 158 manages two UEs 118, 122. Examples of UEs include mobile phones, personal digital assistants (PDAs), computers, and other devices that are adapted to communicate with the mobile communication system 100.

The eNBs 152, 156, 158 may communicate via links 142, 146, 148 with each other, via an X2 interface, as defined within 3GPP LTE. Each eNB may also communicate with a Mobile Management Entity (MME) and/or a System Architecture Evolution (SAE) Gateway, not shown. The communication between an MME/SAE Gateway and an eNB is via an S1 interface, as defined within the Evolved Packet Core specification within 3GPP LTE.

Figure 2:
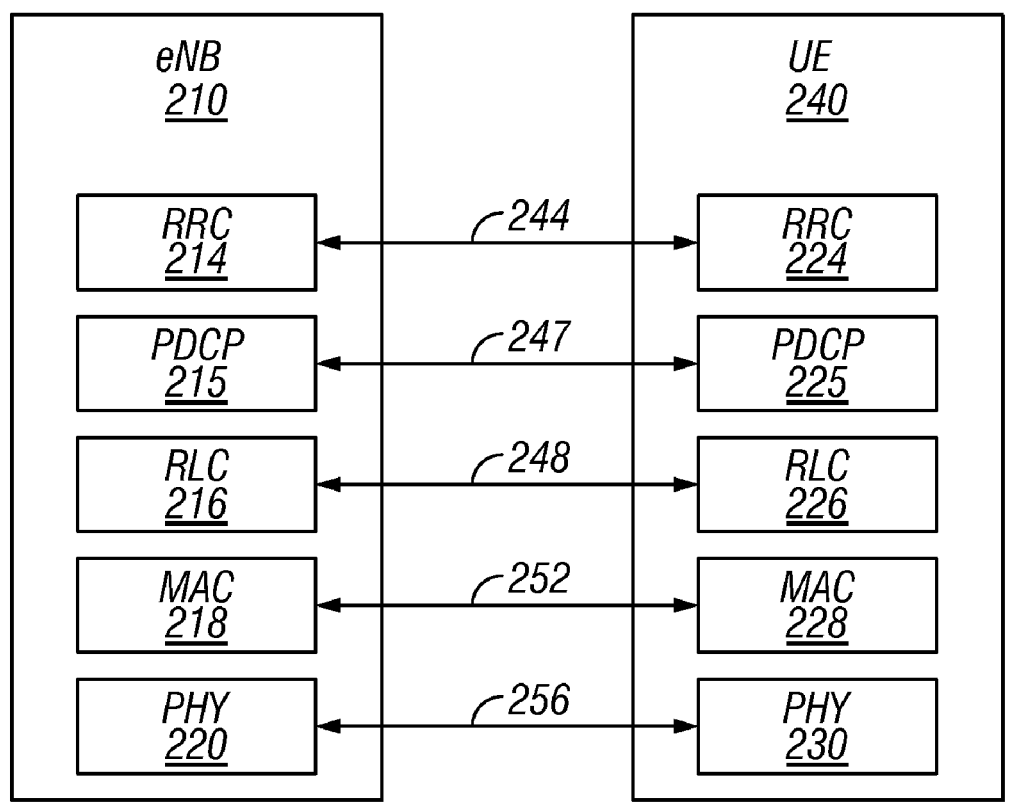
FIG. 2 is a diagram of a portion of the protocol stack for the control plane of a typical eNodeB (eNB) and a typical UE.

FIG. 2 is a diagram of a portion of the protocol stack for the control plane of a typical eNB 210 and a typical UE 240. The eNB 210 and UE 240 each typically contains a dedicated processor and/or microprocessor (not shown) and associated memory (not shown). The protocol stacks provide a radio interface architecture between an eNB 210 and a UE 240.

The control plane in general includes a Layer 1 (L1) stack comprising a physical (PHY) layer 220, 230; a Layer 2 (L2) stack comprising a medium access control (MAC) 218, 228 sublayer, a Radio Link Control (RLC) sublayer 216, 226, and a Packet Data Convergence Protocol (PDCP) sublayer 215, 225; and a Layer 3 (L3) stack comprising a Radio Resource Control (RRC) layer 214, 224. Each layer communicates with its compatible layer, as shown by 244, 247, 248, 252, and 256.

The RRC layer 214, 224 is a L3 radio interface that handles the control plane signaling of L3 between the UEs and E-UTRAN and performs functions for connection establishment and release, broadcast of system information, radio bearer establishment/reconfiguration and releases, RRC connection mobility procedures, paging notification and release, and outer loop power control. The PDCP L2 sublayer 215, 225 performs header compression and decompression, and ciphering (encryption). The RLC L2 sublayer 216, 226 provides transparent, unacknowledged, and acknowledged data transfer service. The MAC L2 sublayer 218, 228 provides unacknowledged data transfer service on the logical channels and access to transport channels. The MAC sublayer 218, 228 is also typically adapted to provide mappings between logical channels and transport channels.

The PHY layer 220, 230 provides information transfer services to MAC 218, 228 and other higher layers 216, 214, 226, 224. Typically the PHY layer transport services are described by their manner of transport. Furthermore, the PHY layer 220, 230 is typically adapted to provide multiple control channels. The UE 240 is adapted to monitor this set of control channels. Furthermore, as shown, each layer communicates with its compatible layer 244, 248, 252, 256. The specifications and functions of each layer are described in detail in the 3GPP LTE specification documents.

Figure 3:
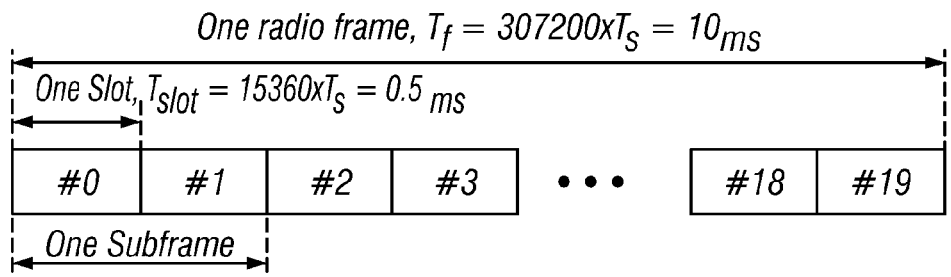
FIG. 3 is an illustration of the generic radio frame structure in the time domain for the orthogonal frequency division multiplexing (OFDM) downlink.

The 3GPP LTE E-UTRA system uses orthogonal frequency division multiple access (OFDMA) for the downlink (eNB to the UEs) and single carrier frequency division multiple access (SC-FDMA) for the uplink (UEs to the eNB). The basic idea underlying orthogonal frequency division multiplexing (OFDM) is the division of the available frequency spectrum into several subcarriers. To obtain a high spectral efficiency, the frequency responses of the subcarriers are overlapping and orthogonal, hence the name OFDM. In the system of 3GPP LTE, the OFDMA downlink transmissions and the uplink transmissions are organized into radio frames with $T_f=307200\times T_s=10$ ms duration. The generic frame structure is applicable to both frequency division duplex (FDD) (the application of frequency-division multiplexing to separate outward and return signals) and time division duplex (TDD) (the application of time-division multiplexing to separate outward and return signals). As shown in FIG. 3, each radio frame is $T_f=307200\times T_s=10$ ms long and consists of 20 slots of length $T_{slot}=15360\times T_s=0.5$ ms, numbered from 0 to 19. A subframe is defined as two consecutive slots where subframe i consists of slots $2i$ and $2i+1$. For FDD, 10 subframes are available for downlink transmission and 10 subframes are available for uplink transmissions in each 10 ms interval. Uplink and downlink transmissions are separated in the frequency domain. For TDD, a subframe is either allocated to downlink or uplink transmission. Subframe 0 and subframe 5 are always allocated for downlink transmission.

Figure 4:
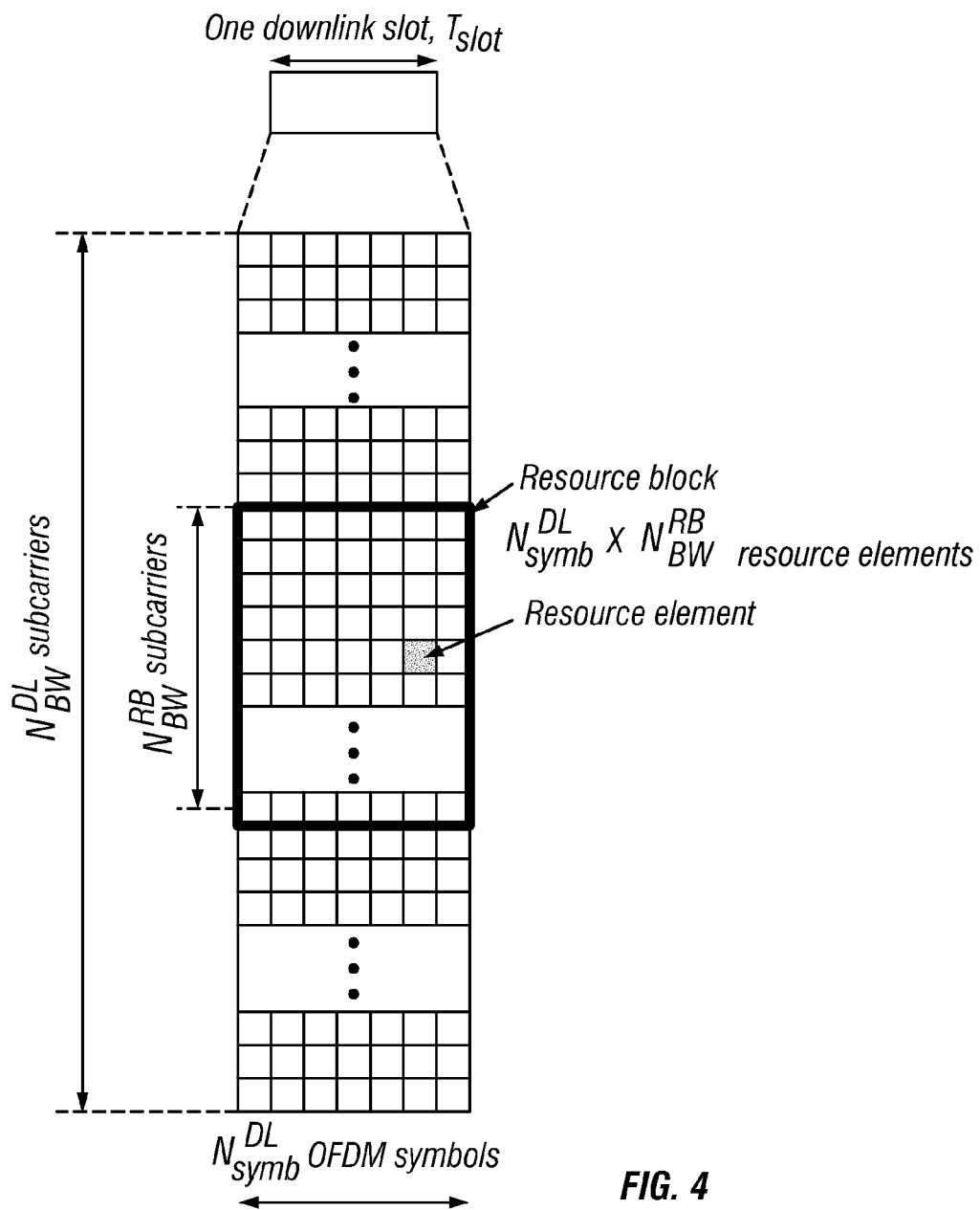
FIG. 4 is an illustration of the OFDM downlink resource grid and structure showing a resource block and resource elements within a resource block.

The downlink signal in each slot is described by a resource grid of $NB_{BW}^{DL}$ subcarriers and $N_{symb}^{DL}$ OFDM symbols. The resource grid and structure is illustrated in FIG. 4. In case of multi-antenna transmission from an eNB, there is one resource grid defined per antenna port. An antenna port is defined by a downlink reference signal (DLRS) that is unique within the cell. Each element in the resource grid for an antenna port p is called a resource element and is uniquely identified by the index pair (k,l) where k and l are the indices in the frequency and time domains, respectively. One, two, or four antenna ports are supported. A resource block is defined as $N_{symb}^{DL}$ consecutive OFDM symbols in the time domain and $N_{BW}^{DL}=12$ consecutive subcarriers in the frequency domain. A resource block thus consists of $N_{symb}^{DL} \times N_{BW}^{RB}$ resource elements.

In 3GPP LTE, the data transmitted over the wireless network is often categorized as either non-real-time (NRT) data or real-time (RT) data. Examples of NRT data include data transmitted during web browsing by a UE or text-messaging to a UE, while an example of RT data is voice communication between UEs.

The data packets (both NRT and RT) are transmitted from the eNB to the UEs in the Physical Downlink Shared Channel (PDSCH). Various modulation and coding schemes (MCSs) are supported on the PDSCH. Modulation schemes include quadrature phase-shift keying (QPSK) and quadrature amplitude modulation (QAM), such as 16-QAM and 64-QAM. Various coding rates, used for error correction, may be used. The combination of modulation schemes and coding rates may result in a large number, e.g., 30, of possible MCSs.

Downlink control signaling from the eNB is transmitted in the Physical Downlink Control Channel (PDCCH) and the Physical Hybrid ARQ Indicator Channel (PHICH). 3GPP LTE uses a hybrid automatic repeat-request (Hybrid ARQ) method to transmit the VoIP packets. Hybrid ARQ requires an acknowledgment signal (ACK) or negative-acknowledgement signal (NAK) to be sent by the receiver back to the transmitter to indicate that the VoIP packet has been received or not received.

The PDCCH and PHICH are formed as an aggregation of resource elements located in predetermined OFDM symbols of the downlink resource blocks. Downlink control signaling includes the ACK/NAK signals (on the PHICH) in response to an uplink data packet, and resource scheduling information (on the PDCCH).

The eNB regularly transmits the DLRS that is modulated into reference symbols in the resource blocks. Since four antenna ports are supported there are four possible reference symbols (R1, R2, R3 and R4), with each of the four reference symbols being associated with an antenna port. The reference symbols are used by the UEs for channel estimation and physical measurements. Typical measurements that take place within the UEs include signal strength or signal-to-noise ratio (SNR), average pathloss, and signal-to-interference ratio (SINR), which may be represented by a channel quality indicator (CQI).

Data packets (both NRT and RT) are transmitted from the UE to the eNB in the Physical Uplink Shared Channel (PUSCH). Uplink control signaling from the UE is transmitted in the Physical Uplink Control Channel (PUCCH), which is defined by two consecutive resource blocks. Uplink control signaling on the PUCCH includes ACK/NAK signals in response to downlink data packets, and CQIs.

The purpose of the CQIs from the UEs is to enable the eNB to perform link adaptation and resource scheduling. Link adaptation, also referred to as adaptive modulation and coding (AMC), means that various modulation schemes and channel coding rates can be applied to the PDSCH. The same modulation and coding scheme (MCS) is applied to all groups of resource blocks scheduled to one UE within one TTI and within a single data stream.

Resource scheduling means the allocation of MCSs and resource blocks (each of which is associated with a set of OFDM subcarrier frequencies) to optimize the DL and UL transmissions for the UEs. The MAC layer in the eNB includes dynamic resource schedulers that allocate physical layer resources for the PDSCH and PUSCH channels. The schedulers take into account various factors, including traffic volume and quality-of-service (QoS) requirements of each UE, in addition to channel quality measurements from the CQIs, when sharing resources between UEs. Resource allocations to the UEs consists of physical resource blocks and MCS. The allocations can be for one transmission time interval (TTI) or for time periods longer than one TTI. The typical manner of scheduling for NRT data is "dynamic" scheduling to each UE at each TTI via the PDCCH. In dynamic scheduling, when a UE's downlink reception is enabled the UE always monitors the PDCCH in order to find possible allocations. During dynamic scheduling, the UE regularly transmits CQIs. Typically this rate of CQI transmission may be at least once every 20 ms, and up to about once every 5 ms. The eNB continuously monitors the CQI so as to select the best MCS and resource blocks for the UE. In 3GPP LTE the UE may also estimate the best MCS and transmit this back to the eNB as the CQI. Because there are a relatively large number of MCSs the CQI must have enough bits to cover the entire range of MCSs. For example, if there are 30 MCSs, then a 5-bit CQI may be required, which would allow 32 levels of channel quality.

Figure 5:
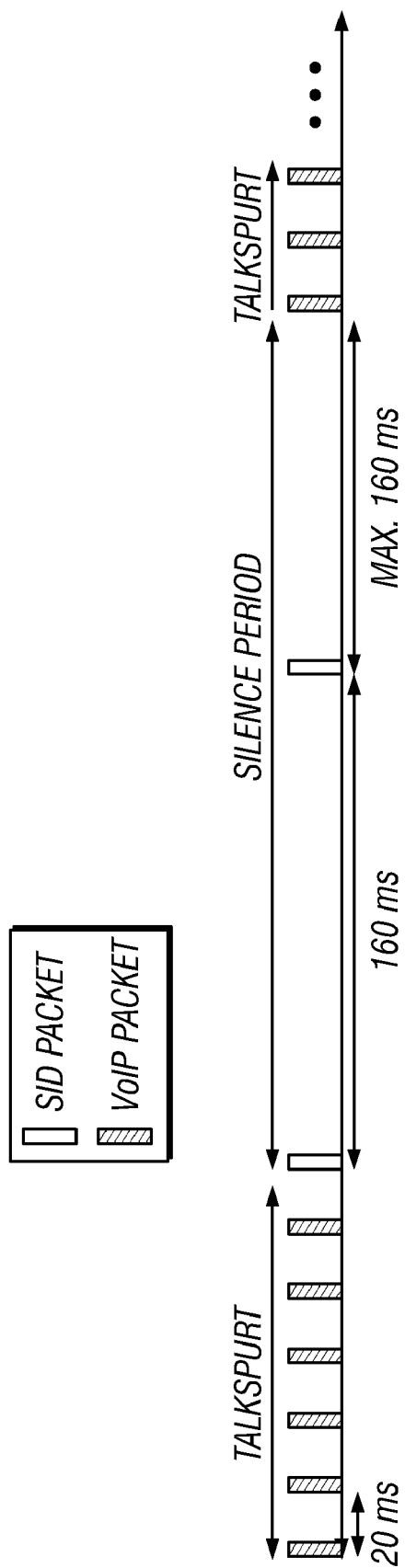
FIG. 5 is an illustration of a typical traffic pattern for two-way voice-over-internet-protocol (VoIP) communications in a wireless communications network.

In 3GPP LTE, voice data (RT data) will be transmitted using voice-over-internet-protocol (VoIP). There are certain unique features of the VoIP traffic pattern, including the use of periodic small VoIP data packets (at a fixed interval of one per 20 ms) and periodic silence indication (SID) packets generated by advanced voice coding/decoding (codec) schemes, like adaptive multi-rate (AMR). AMR is an audio data compression scheme optimized for speech coding and was adopted as the standard speech codec by 3GPP. A typical VoIP traffic pattern is shown in FIG. 5. For two-way voice communication, it is common that when one party is talking the other party will be listening. Thus, for example, DL speech bursts, sometimes called "talkspurts", will occur at the same time as UL silence periods. There are thus two distinct periods: talkspurt periods and silence periods. During a talkspurt period, a VoIP packet arrives every 20 ms, while in a silence period, a SID packet arrives every 160 ms.

The present invention relates to optimizing CQI transmissions by the UEs during VoIP transmissions. It is anticipated that most UEs on the network will be capable of transmitting and receiving both NRT data and RT data. However, the network may include some "voice-dedicated" UEs that are capable of transmitting and receiving VoIP but not capable of transmitting or receiving NRT data. The methods of this invention may be implemented in UEs that are capable of transmitting and receiving both NRT data and RT data, as well as in voice-dedicated UEs.

As a baseline, CQIs are transmitted by the UE to the eNB periodically, which is configured by the eNB using RRC signaling. In 3GPP LTE, VoIP transmission will be handled using "semi-persistent" scheduling. In contrast to dynamic scheduling, in "semi-persistent" scheduling when a UE's downlink reception is enabled, if the UE cannot find its allocation on the PDCCH, a downlink transmission according to a predefined allocation is assumed. This predefined allocation is configured by RRC signaling on the allocated physical resource block. As a result, the UE identifies the predefined resources using "blind" decoding, a method which is explained in detail below. Otherwise, if the UE finds its allocation on the PDCCH, the dynamically scheduled allocation overrides the predefined allocation for that TTI and the UE does not perform blind decoding of the predefined resources.

In the present invention, during VoIP transmission when VoIP data packets are being DL transmitted, the UE uplink transmits CQIs at a rate slower than during NRT data transmission (when the eNB is performing dynamic scheduling). Also, the CQI uses fewer bits than are used during NRT data transmission. During silence periods of the VoIP transmission, no CQIs are UL transmitted by the UE. The present invention includes several methods for detecting the beginning of a silence period so that during silence periods, the eNB can release the PUCCH resource allocated for CQIs and allocate it to other UEs.

Figure 6:
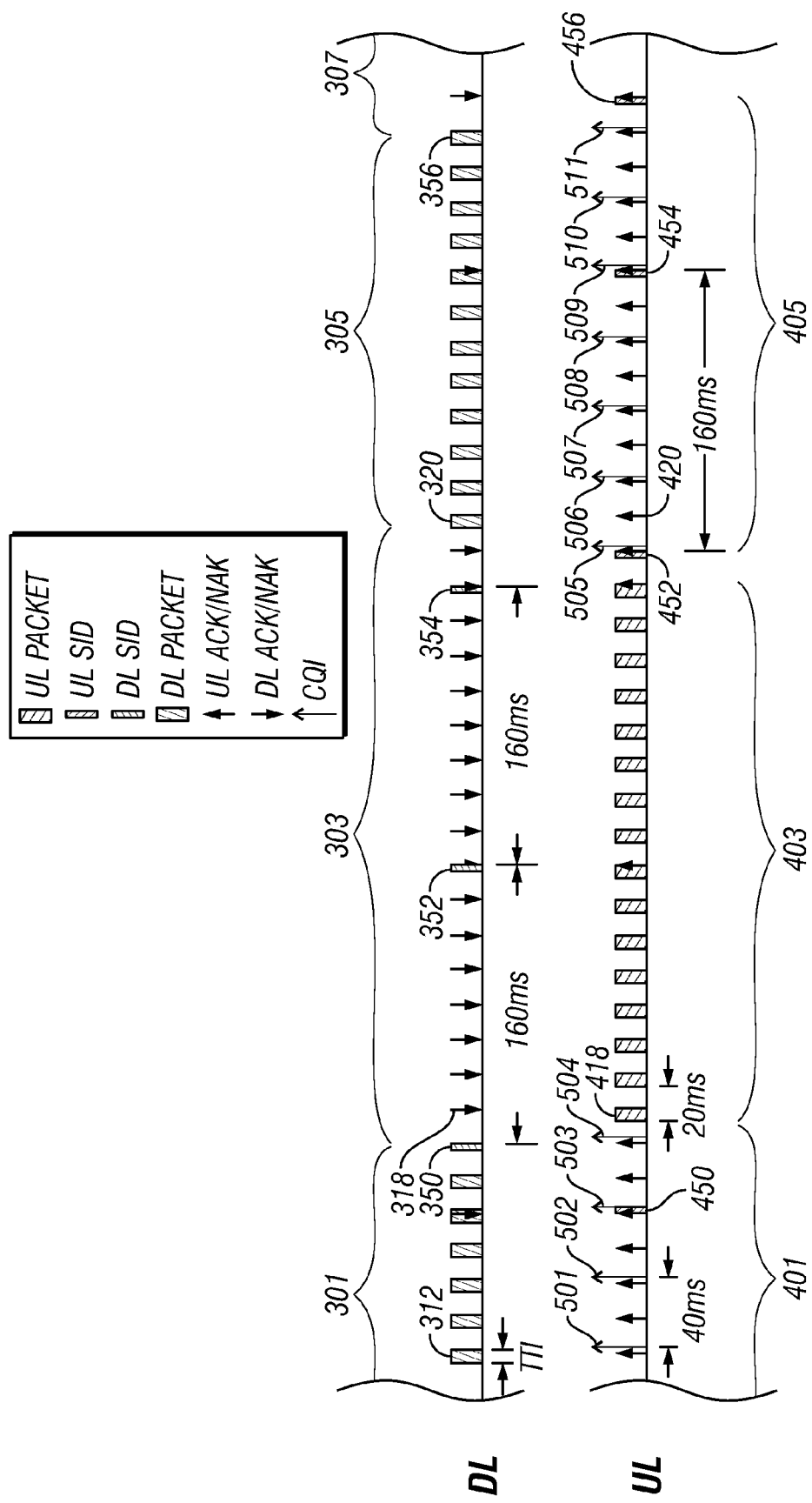
FIG. 6 is an illustration of two-way VoIP communications according to the present invention and shows downlink (DL) and uplink (UL) silence periods and UL channel quality indictor (CQI) transmissions occurring during UL silence periods.

FIG. 6 shows the present invention in a typical traffic pattern for two-way VoIP communication. In each direction (DL and UL), there will be talkspurt periods and silence periods. The voice codec sends out VoIP packets once per 20 ms during talkspurt and SID packets once per 160 ms during silence periods. Each VoIP packet occurs within one transmission time interval (TTI), as shown by typical DL VoIP packet 312. In the example of FIG. 6, a TTI is 1 ms, so the fixed interval between VoIP packets is 20 TTIs.

DL talkspurt periods are shown as 301 and 305, and DL silence periods are shown as 303 and 307. DL SID 350 indicates the start of DL silence period 303 and is followed by DL SID 352 160 ms later. DL SID 354 is the last SID from DL silence period 303 because it is followed by DL VoIP packet 320 which occurs less than 160 ms after DL SID 354. DL SID 356 indicates the start of DL silence period 307. Each DL VoIP packet is followed by a UL acknowledgement signal (ACK) or negative-acknowledgement signal (NAK), which indicate successful or unsuccessful receipt, respectively, of the DL VoIP packet. For example, the DL transmission of VoIP packet 320 is followed by a UL ACK 420.

A UL talkspurt period is shown as 403, and UL silence periods are shown as 401 and 405. UL SID 450 is the last SID from UL silence period 401 because it is followed by UL VoIP packet 418 which occurs less than 160ms after UL SID 450. UL SID 452 is the first SID following UL talkspurt period 403 and indicates the beginning of UL silence period 405. UL SID 452 is followed by UL SID 454 160ms later, and UL SID 456 is the last SID in UL silence period 405. Each UL VoIP packet is followed by a DL acknowledgement signal (ACK) or negative-acknowledgement signal (NAK), which indicate successful or unsuccessful receipt, respectively, of the UL VoIP packet. For example, the UL transmission of VoIP packet 418 is followed by a DL ACK 318.

FIG. 6 shows the UL CQIs transmitted during DL talkspurt periods, like CQIs 501-504 in DL talkspurt period 301 and CQIs 505-511 in DL talkspurt period 305. FIG. 6 also shows that no UL CQIs are transmitted during DL silence periods 303, 307. In the conventional method of transmitting CQIs during NRT data transmission, the CQIs are sent continuously at a rate of at least once every 20 ms on the PUCCH, including during UL transmission of NRT data packets. In addition, in the conventional method each CQI has a fixed number of bits sufficient to cover the entire range of possible MCSs. However, in the present invention the CQIs are only transmitted during DL talkspurt periods; each CQI may have a significantly fewer number of bits; and the CQIs may be transmitted at a rate substantially lower than the conventional rate. As shown by the example in FIG. 6, the rate is once every 40 ms as shown by CQIs 501 and 502.

As previously mentioned, during VoIP transmission, semi-persistent scheduling will be used. When a DL resource allocation is persistently allocated to a UE, the UE knows in which resource blocks to receive the DL VoIP data packets but there will be no signaling information on the PDCCH for the UE to know what MCS the eNB will use to send the DL VoIP data packets. What the UE does is "blind" decoding, i.e., it attempts to decode the data by trying the possible MCSs. 3GPP LTE proposes that during semi-persistent scheduling, to reduce the complexity in the UE to perform blind decoding, only a limited number of MCSs will be possible. For example, the maximum number of MCSs may be 4. In that example, the UE knows which 4 MCSs are possible and will "blindly" decode the DL VoIP data packets by trying each of the MCSs until decoding is successful.

Because a reduced number of MCSs are possible, the CQI only needs to have enough bits to cover the range of MCSs. For example, a 2-bit CQI would be sufficient to express 4 levels of channel quality. Also, the difference between each CQI level will be larger if there are 4 levels than if there are a larger number of levels, for example 32. Thus, under normal circumstances, it will take significantly longer for the channel quality to change by one level in a 4-level example than in a 32-level example. For this reason the rate at which the CQIs are transmitted (the frequency of CQI reporting) can be much lower during DL VoIP talkspurt periods than during conventional DL NRT data transmission. In the present invention, during DL VoIP talkspurt periods, the CQIs may have fewer bits and/or be transmitted less frequently.

There may be infrequent occasions where large NRT data packets need to be transmitted by the eNB during a VoIP session, for example signalling packets used for control information. In order to handle this, some event-driven CQI reporting can be used, i.e., the eNB can request the UE to send a more detailed CQI report and more frequently. On these occasions, the slower-rate and fewer-bit method of CQI transmission described above will be temporarily suspended.

In the present invention, during DL silence periods, like periods 303, 307 in FIG. 6, no CQIs are transmitted by the UE. This is possible because a SID packet is so small, it can be sent with robust MCS by using only one physical resource block, so there is no need for channel quality information. Because there are no CQIs in the UL during DL silence periods, the PUCCH resource allocated to this UE for CQIs can be released and reallocated to other UEs.

In order for the UE to be able to terminate CQI UL transmission and the eNB to be able to reallocate the PUCCH resource to other UEs, both the UE and eNB need a method to know when the DL silence period starts. For example, in FIG. 6, both the eNb and the UE need to be able to identify DL SID 350 at the end of DL talkspurt 301 and DL SID 356 at the end of DL talkspurt 305.

Figure 7:
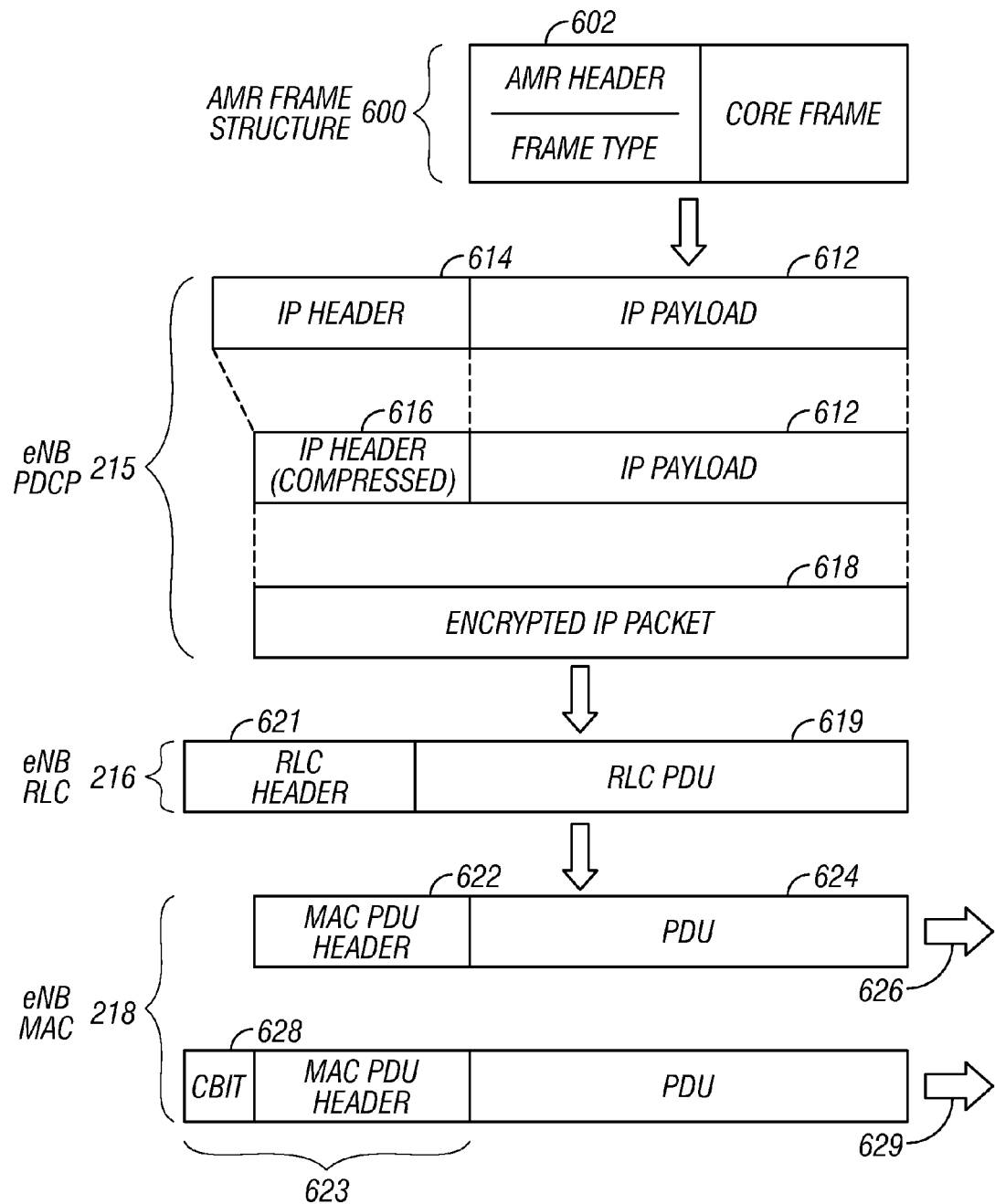
FIG. 7 is a diagram illustrating a method for identifying the start of a silence period.

In one technique, to be explained with reference to FIG. 7, both the eNB and UE can inspect the IP packet payloads to determine if the packet is a SID or voice data. As shown in FIG. 7, the generic AMR codec frame structure 600 includes a header 602 with a Frame Type field that identifies the frame as being voice data or a SID. Thus AMR frames that are SIDs can be identified from inspection of the AMR header. Similarly, AMR frames that are voice data can be identified from inspection of the AMR header. In 3GPP LTE the eNB contains the PDCP layer 215 (see FIG. 2) that converts the AMR frame into the payload portion 612 of the IP packet and adds the IP header 614. The PDCP layer 215 compresses the IP header, typically from 40 bytes to 2 or 4 bytes, to form the compressed IP header 616, but the IP payload portion 612 does not become compressed. Thus the IP payload 612 can still be identified as a SID after header compression by the PDCP. After header compression, the PDCP performs encryption to form an encrypted IP packet 618. The encrypted IP packet 618 includes the encrypted payload portion, so the IP payload can no longer be identified by the eNB as a SID. Thus in the present invention the eNB inspects each of the IP packet payloads at any time prior to encryption by the PDCP and flags those IP packets that are SIDs. The PDCP layer 215 then passes the encrypted IP packet 618 to RLC layer 216 for further processing into a protocol data unit (PDU) 619 with an RLC header 621, and then to the eNB's MAC layer 218. The MAC layer 218 converts the encrypted VoIP packet 619 into a MAC protocol data unit (PDU) that includes a MAC PDU header 622 and the PDU 624. The MAC PDU is then transmitted to the UE at arrow 626.

At the UE, the MAC PDUs are received and passed up to the UE's PDCP layer. The encrypted IP packets are decrypted at the UE's PDCP layer into IP packets with headers and payloads (like IP header 614 and IP payload 612). After decryption at the UE, the IP packet payloads can be inspected by the UE to identify those that are SIDs.

The time between the inspection by the eNB to identify a SID and the inspection by the UE to identify the SID is negligible compared to the rate at which the CQIs are transmitted by the UE. So essentially the eNB and the UE inspect the IP packet payloads to detect SIDs in a synchronized manner. The eNb is thus able to reallocate the UE's PUCCH resources to other UEs, and the UE is able to terminate CQI transmission.

In a second technique for identifying SIDS, the eNB and UE can identify an IP packet payload by its size. Instead of checking the IP packet payload to determine if it is a SID, both the eNB and the UE can inspect each IP packet for size. It is known that a SID packet is smaller than the smallest possible VoIP data packet. For example, a SID packet may be set at 15 bytes in length, which is smaller than the smallest possible VoIP data packet. In this technique the eNB checks each IP packet and flags those less than a predetermined size as SIDs. Similarly, the UE checks each IP packet it receives to identify those less than a predetermined size as SIDs. The checking for packet size can be done at different stages of the process illustrated in FIG. 7. This is because if the IP packet size is small, the IP header 614 and compressed header 616 will also be small, the encrypted IP packet 618 will also be small, and the MAC PDU 624 will also be small. Thus the eNB and the UE can check the packet size at any one of these process steps. With this second technique, the eNB and UE also detect SIDs in a synchronized manner. The eNb is thus able to reallocate the UE's PUCCH resources to other UEs, and the UE is able to terminate CQI transmission.

In both of the above-described SID detection techniques, both the eNB and the UE perform SID detection by inspecting the IP packets. However, in a modification of both of the techniques, only the eNB flags the SIDs. Referring again to FIG. 7, the PDCP layer 610 passes the encrypted IP packet 618 to the eNB's MAC layer 620. The MAC layer 620 converts the encrypted IP packet 618 into a MAC protocol data unit (PDU) that includes a MAC PDU header 622 and the PDU 624. However, instead of transmitting the MAC PDU to the UE at arrow 626, if a SID was previously flagged, then the MAC layer 620 modifies the MAC header 622 to MAC header 623 with a "control bit" (cbit) 628. This can be done by modifying one of the existing header bits (for example the most significant bit), for example changing that bit from "0" to "1". Alternatively, the cbit 628 can be an extra bit added to the MAC header 622. The MAC PDU with the MAC header 623 containing the cbit 628 is then transmitted to the UE at arrow 629.

At the UE, the MAC PDUs are received at the UE's MAC layer and those with a cbit are flagged as SID packets. With this modification to the technique, only the eNB needs to inspect the IP packet payloads to either identify the packet as a SID packet or to identify it by packet size. The UE only needs to detect the cbits in the headers of the MAC PDUs received from the eNB. This reduces the complexity of the UE.

In the above described techniques and modified techniques for identifying SIDS, only the first DL SID occurring after a DL VoIP packet needs to be identified, because it is this SID that indicates the start of a silence period. For example, referring again to FIG. 6, it is DL SID 350 that needs to be flagged by the eNB because that indicates the start of DL silence period 303. Thus it is not necessary for SID 352 to be flagged. Because the AMR Frame Type also identifies frames that are voice frames, when the eNB inspects the IP packet payloads, it checks for both VoIP data packets and SID packets and only needs to flag the first SID packet that occurs after a VoIP data packet. If the technique is the one where the UE also inspects the IP packet payloads, then the UE only needs to flag the first SID packet that occurs after a VoIP data packet.

Both the eNB and the UE also need a method to know when the DL silence period ends and DL VoIP data packet transmission begins so that the eNB can allocate the PUCCH resource back to the UE and so the UE can start CQI transmission. This situation is shown in FIG. 6 by DL silence period 303 (with last DL SID 354) followed by DL talkspurt period 305 (with first DL VoIP data packet 320). The UE needs to be able to identify this transition so that it can begin CQI transmission, as shown by CQI 505, and the eNB needs to know this transition so that it can allocate the PUCCH resource the UE needs to transmit the CQIs. The techniques for doing this are directly analogous to those described above for detecting the start of a DL silence period. The only difference is that the eNB only needs to flag the first VoIP data packet that occurs after a SID packet, e.g., VoIP data packet 320 after SID packet 354. If the technique is the one where the UE also inspects the IP packet payloads, then the UE only needs to flag the first VoIP data packet that occurs after a SID packet. If the technique is the one where the eNB modifies the MAC header 623 with a cbit 628 (FIG. 7), then a first cbit will identify the first SID packet after a VoIP packet (start of a silence period) and a second cbit will identify the first VoIP packet after a SID packet (end of a silence period).

As mentioned above, the base stations (eNBs) and mobile devices (UEs) have dedicated processors and/or microprocessors and associated memory. Thus the above-described method may be implemented in software modules or components of executable code stored in memory in the base stations and mobile devices. The dedicated processors and/or microprocessors perform logical and arithmetic operations based on the program instructions stored in memory to perform the method of this invention.

While the present invention has been described above for VoIP, which has a traffic pattern characterized by periodic packets, it is fully applicable to applications other than VoIP where the traffic patterns are characterized by small periodic packets. Also, the present invention is applicable to other wireless communications networks, like those based on the IEEE 802.16 m standards.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for uplink transmission of channel quality indicators (CQIs) by a user equipment (UE) in a wireless communications network that includes an eNodeB, wherein the eNodeB is capable of non-real-time (NRT) data transmission and voice-over-internet-protocol (VoIP) transmission comprising VoIP packets, each having an IP header and IP payload, and silence indication (SID) packets, each having an IP header and IP payload, wherein the VoIP packets are transmitted at a first fixed interval and representing a talkspurt period and the SID packets are transmitted at a second fixed interval greater than said first interval and representing a silence period, and wherein the UE is capable of receiving both NRT data transmission and VoIP transmission, the method comprising:
   at the eNB, converting the VoIP packets and SID packets into medium access control (MAC) protocol data units (PDUs) having MAC headers, and modifying the MAC header of a PDU with a control bit prior to transmission to the UE if the IP payload associated with said PDU is a SID packet that follows a VoIP packet or a VoIP packet that follows a SID packet;
   when the eNodeB is transmitting NRT data to the UE, transmitting CQIs to the eNodeB at a first rate, each CQI having a first fixed number of bits; and
   when the eNodeB is transmitting VoIP to the UE,
      at the UE, detecting the first VoIP packet after a SID packet to identify the start of a talkspurt period by detection of a control bit in the modified MAC headers;
      during said identified talkspurt period, transmitting CQIs from the UE to the eNodeB according to at least one of transmitting CQIs at a second rate slower than said first rate, and transmitting CQIs with each CQI having a second fixed number of bits less than said first fixed number of bits;
      at the UE, detecting the first SID packet after a VoIP packet to identify the start of a silence period by detection of a control bit in the modified MAC headers; and
      during said identified silence period, not transmitting CQIs from the UE to the eNodeB.

2. The method of claim 1 wherein the UE is a first UE and wherein the wireless communications network includes a second UE, said second UE being incapable of receiving NRT data transmission from the eNB but capable of receiving VoIP transmission, and further comprising:
   when the eNodeB is transmitting VoIP to the second UE,
      during a talkspurt period, transmitting CQIs from the second UE to the eNodeB at the same rate and with the same number of bits as the first UE transmits CQIs to the eNodeB, and
      during a silence period, not transmitting CQIs from the second UE to the eNB.

3. The method of claim 1 wherein the eNodeB downlink transmits to the UE in orthogonal frequency division multiplexing (OFDM) resource blocks and the UE transmits to the eNodeB in OFDM resource blocks, wherein certain of the resource blocks comprise a physical uplink control channel (PUCCH) allocated to the UE, and wherein the CQIs are transmitted in the PUCCH.

4. The method of claim 3 wherein the wireless communications network includes a plurality of other UEs, at least one of said other UEs being incapable of receiving NRT data transmission from the eNB, and further comprising, during a silence period when the UE is not transmitting CQIs to the eNodeB, the UE's PUCCH resource blocks are reallocated by the eNodeB to other UEs.

5. A mobile device for connection in a cellular network, the network having an eNodeB capable of non-real-time (NRT) data transmission and voice-over-internet-protocol (VoIP) transmission comprising VoIP packets and silence indication (SID) packets, each of the VoIP packets and SID packets having an IP header and an IP payload, the VoIP packets representing a talkspurt period and the SID packets representing a silence period, the mobile device being capable of receiving both NRT data transmission and VoIP transmission and comprising:
   a processor;
   memory accessible by the processor; and
   computer program instructions in the memory and readable by the processor for performing the processor-implemented steps of
      (a) when the eNodeB is transmitting NRT data, transmitting channel quality indicators (CQIs) to the eNodeB at a first rate, each CQI having a first fixed number of bits; and
      (b) when the eNodeB is transmitting VoIP to the UE,
         identifying at the UE the start of a talkspurt period by detecting a control bit in an IP header and, during a talkspurt period, transmitting CQIs to the eNodeB at a second rate slower than said first rate, each CQI having a second fixed number of bits less than said first fixed number of bits; and
         identifying at the UE the start of a silence period by detecting a control bit in an IP header and, during a silence period, not transmitting CQIs to the eNodeB;
         wherein the VoIP packets and SID packets are received by the UE as medium access control (MAC) protocol data units (PDUs), each PDU having a MAC header indicating if the PDU is associated with a VoIP packet or a SID packet, and wherein said control bits are contained within the MAC headers.

6. A method for non-real-time (NRT) data transmission and voice-over-internet-protocol (VoIP) transmission in a cellular network that includes an eNodeB, a first user equipment (UE) capable of receiving both NRT data transmission and VoIP transmission, and a plurality of other UEs, wherein the eNodeB transmits to the first and other UEs in orthogonal frequency division multiplexing (OFDM) resource blocks and the first and other UEs transmit to the eNodeB in OFDM resource blocks, wherein certain of the resource blocks comprise a physical uplink control channel (PUCCH) allocated to the first UE, wherein the first UE transmits channel quality indicators (CQIs) in the PUCCH, and wherein the first UE is capable of receiving both NRT data transmission and VoIP transmission, the method comprising:
  transmitting NRT data from the eNodeB to the first UE;
  when the eNodeB is transmitting NRT data to the first UE, transmitting CQIs from the first UE to the eNodeB at a first rate, each CQI having a first fixed number of bits;
  transmitting VoIP from the eNodeB to the first UE, the VoIP transmission comprising VoIP packets, each having a header and a payload, and silence indication (SID) packets, each having a header and a payload, the VoIP packets transmitted at a first fixed interval and representing a talkspurt period and the SID packets transmitted at a second fixed interval greater than said first interval and representing a silence period;
  prior to transmission to the first UE, converting the VoIP and SID packets at the eNodeB into medium access control (MAC) protocol data units (PDUs) having MAC headers, and modifying the MAC header of a PDU at the eNodeB with a control bit if the payload associated with said PDU is a SID packet that follows a VoIP packet or a VoIP packet that follows a SID packet; and
  when the eNodeB is transmitting VoIP to the first UE,
  at the UE, detecting the first VoIP packet after a SID packet to identify the start of a talkspurt period by inspection of the VoIP packet headers and SID packet headers;
  during a talkspurt period, transmitting CQIs from the first UE to the eNodeB according to at least one of transmitting CQIs at a second rate slower than said first rate, and transmitting CQIs with each CQI having a second fixed number of bits less than said first fixed number of bits;
  at the UE, detecting the first SID packet after a VoIP packet to identify the start of a silence period by inspection of the VoIP packet headers and SID packet headers;
  during a silence period, not transmitting CQIs from the first UE to the eNodeB; and
  at the eNodeB, during a silence period when the first UE is not transmitting CQIs to the eNodeB, reallocating the first UE's PUCCH resource blocks to other UEs;
  wherein inspection of the VoIP packet headers and SID packet headers at the first UE comprises detecting said controls bit in the modified MAC headers.

* * * * *